United States Patent
Forzan et al.

(12)

(10) Patent No.: US 8,524,352 B2
(45) Date of Patent: Sep. 3, 2013

(54) SELF-STABILISED STIFFENER ENABLING ELEMENT RECOVERY

(75) Inventors: Mathieu Forzan, Toulouse (FR); Philippe Bernadet, Colomiers (FR)

(73) Assignee: Airbus Operations (SAS), Toulouse (FR)

( * ) Notice: Subject to any disclaimer, the term of this patent is extended or adjusted under 35 U.S.C. 154(b) by 430 days.

(21) Appl. No.: 12/438,252

(22) PCT Filed: Aug. 30, 2007

(86) PCT No.: PCT/FR2007/051855
§ 371 (c)(1),
(2), (4) Date: Aug. 9, 2010

(87) PCT Pub. No.: WO2008/034988
PCT Pub. Date: Mar. 27, 2008

(65) Prior Publication Data
US 2010/0297390 A1    Nov. 25, 2010

(30) Foreign Application Priority Data

Sep. 21, 2006 (FR) ...................................... 06 53880

(51) Int. Cl.
*B64C 1/06* (2006.01)
(52) U.S. Cl.
USPC .......................................... 428/119; 244/119

(58) Field of Classification Search
CPC ........................................................ B64C 1/064
USPC ................ 428/119, 57; 244/119, 123.1, 131
See application file for complete search history.

(56) References Cited

U.S. PATENT DOCUMENTS 6,561,459 B2 * 5/2003 Amaoka et al. ............ 244/123.7

FOREIGN PATENT DOCUMENTS

| DE | 26 42 523 A1 | 3/1978 |
| EP | 1 439 121 A1 | 7/2004 |
| WO | 02/098733 A | 12/2002 |

OTHER PUBLICATIONS

International Search Report, PCT/FR2007/051855, mailed Jan. 31, 2008.

* cited by examiner

*Primary Examiner* — Alexander Thomas
(74) *Attorney, Agent, or Firm* — Greer, Burns & Crain Ltd.

(57) ABSTRACT

A stiffener for a structure submitted to tensile and/or compression and/or shear stresses, that includes a shaped section including: a contact area with an element to be stiffened having a closed cross-section and providing stability, the aforementioned area including first and second legs; and a core normal to the element to be stiffened that provides a support surface capable of element recovery, the aforementioned core being formed by one of the two legs. Application in aircraft structures.

11 Claims, 3 Drawing Sheets

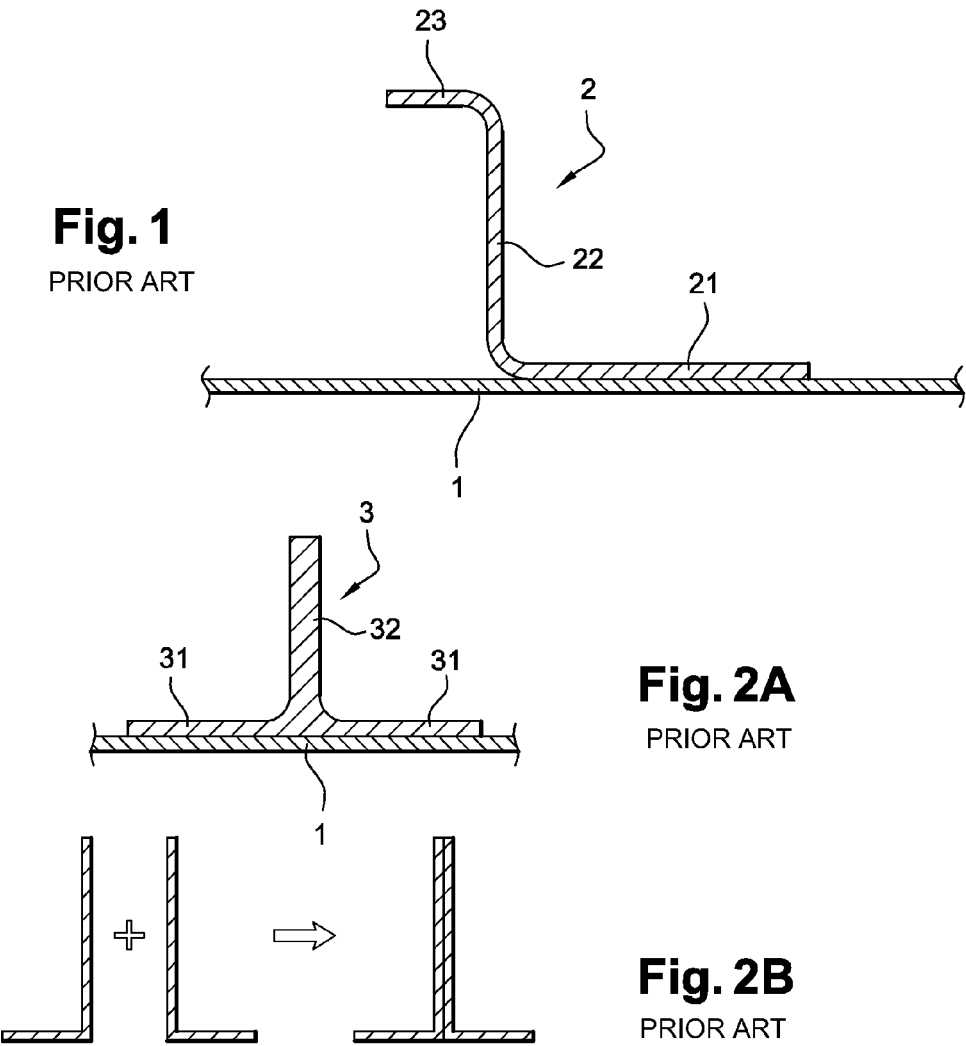
Fig. 1 PRIOR ART
Fig. 2A PRIOR ART
Fig. 2B PRIOR ART
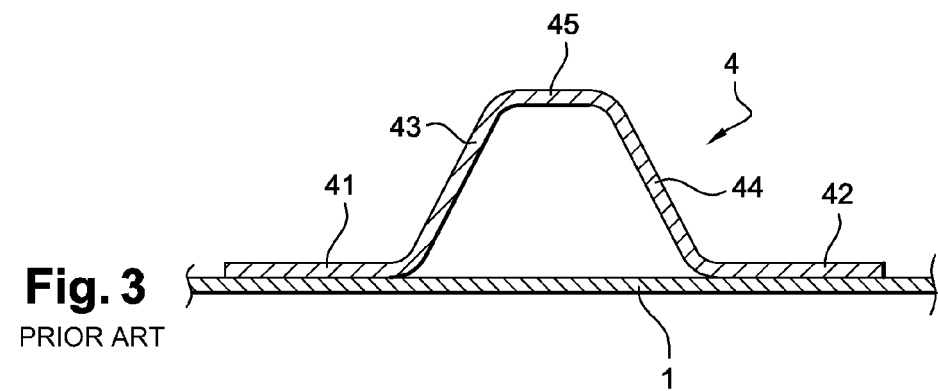
Fig. 3 PRIOR ART

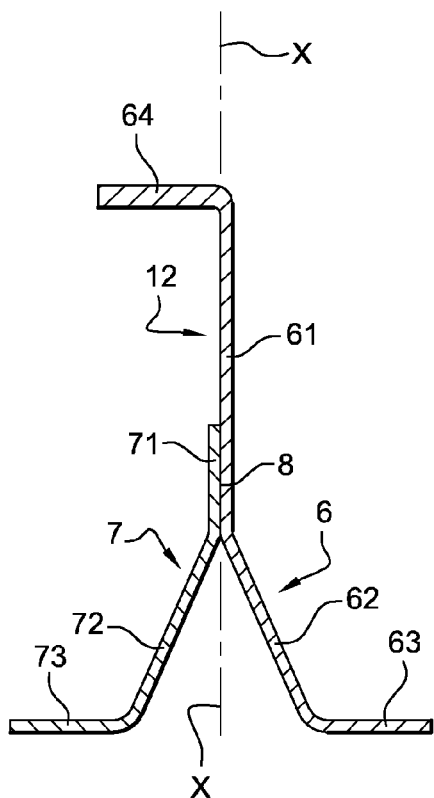
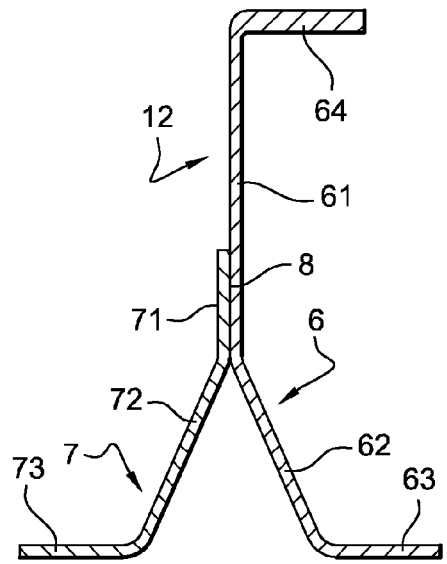
Fig. 4              Fig. 5
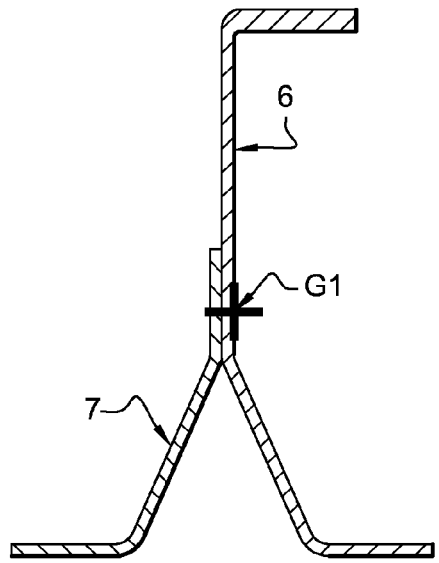
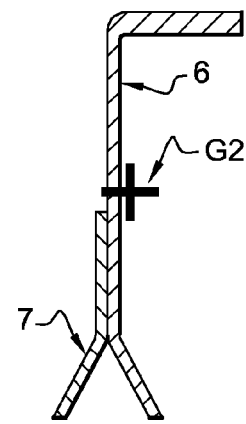
Fig. 6A            Fig. 6B

SELF-STABILISED STIFFENER ENABLING ELEMENT RECOVERY

CROSS-REFERENCE TO RELATED APPLICATIONS

This application is the National Stage of International Application No. PCT/FR2007/051855 International Filing Date, 30 Aug. 2007, which designated the United States of America, and which International Application was published under PCT Article 21 (s) as WO Publication No. WO2008/034988 A1 and which claims priority from, and the benefit of, French Application No. 200653880 filed on 21 Sep. 2006, the disclosures of which are incorporated herein by reference in their entireties.

The aspects of the disclosed embodiments concern a stiffener for both stable stiffening of a structure and for mounting elements on that structure. The aspects of the disclosed embodiments also concern an aircraft structure that has at least one such stiffener.

The disclosed embodiments have applications in the field of mechanics, and particularly in the field of aeronautics, for the mechanical behavior of structural aircraft elements

BACKGROUND

There are many structural elements in an aircraft that require the use of additional pieces to improve the mechanical behavior of these structural elements. These additional pieces can be stiffeners in particular. These stiffeners are profiled parts attached to the structural elements of the aircraft, for example to transfer loads longitudinally or to stabilize those elements (to prevent them from bubbling or buckling due to shearing or compressive forces).

Stiffeners can be used in the aircraft fuselage, for example, as frames or stringers to stiffen the skin and certain specific areas, such as the door frames. They can also be used in the wing units of the aircraft, in the sense of wing spars (longerons) or ribbing (ribs).

Stiffeners can stiffen the structure locally, in the vertical or longitudinal direction, at places where the stresses are high.

Stiffeners can have cross sections with different shapes. The cross section of the stiffener depends on many parameters, such as the shape of the structural element to be stiffened or the main function it is supposed to perform. The known stiffeners generally have a Z, T, J or Ω cross section. FIGS. 1, 2 and 3 show examples of different cross sections that are known.

More specifically, FIG. 1 shows an example of a stiffener with a Z-shaped cross section. Such a Z-shaped stiffener 2 has 3 parts: a cap 21, a core 22 and a head 23. The cap 21 is in contact with the element to be stiffened 1 and thus takes its shape. The core 22, which has two "plane" surfaces, can potentially serve to hold other elements. The head 23 serves to stabilize the stiffener, that is, to prevent its section from tilting into its plane.

FIG. 2A shows an example of a T-shaped stiffener. This T-shaped stiffener 3 has two parts: a cap 31 and a core 32. The cap 31 is in contact with the element being stiffened and thus takes its shape. The core 32, which has two "plane" surfaces, can potentially serve to mount other elements. As a composite, such a stiffener could, for example, be obtained by RTM technology (Resin Transfer Molding) by co-injecting two L-shaped performs positioned back to back, as shown in FIG. 2B.

In these two examples of stiffeners, like a J-shaped stiffener, the stiffener has a core that forms a supporting surface. A supporting surface is a plane surface that is perpendicular or quasi-perpendicular to the element being stiffened that can hold an additional element so that that element is in constant contact with the supporting surface. Thus, such a supporting surface can ensure that another element, structural or not, is mounted. In other words, these types of stiffeners with J, T or Z-shaped cross sections each have a plane surface onto which an additional element can be mounted.

However, the shape of these stiffeners can be a drawback when the structure is subject to certain forces. Indeed, when the stiffener is compressed, it has a tendency to tilt, i.e., it has a tendency to buckle when the compression reaches a certain level. To prevent the stiffener from buckling, it is necessary to add additional pieces, such as stabilization clips placed over the stiffener, whose role is to prevent their load from tilting.

To solve these stability problems, there are stiffeners with an Ω-shaped cross section. An example of such an Ω-shaped cross section is shown in FIG. 3. In the example in FIG. 3, this stiffener 4 has an Ω-shaped cross section. It has a head 45, two cores 43 and 44 and two caps 41 and 42, symmetrical on either side of the median plane of the head 45. The shape of the stiffener, and particularly the fact that combined with the element to be stiffened the section obtained is closed, a section similar to a hollow beam, gives said stiffener stability. In other words, the stiffener is stable by itself, without adding any additional parts. It is autostabilized. Thus, even if such a stiffener is compressed, it is easy to see that the stiffener will not be tilted to either one side or the other.

However, such an Ω-shaped stiffener has no simple supporting surface for other elements. Indeed, besides its two caps, such a stiffener has no surface really adapted to take other elements beyond orienting its head and its cores (none is perpendicular to the surface of the element being stiffened) and beyond problems associated with installing any fastener in closed sections (controllability, specific attachments . . . ).

Thus, depending on the structural element being stiffened and the functions being performed, the choice is to use a stiffener with a supporting surface, like a stiffener with a Z, T or J-shaped cross section or an autostabilized stiffener, like the stiffener with the Ω-shaped cross section.

Now, the current trend in aeronautics is that there are always more elements to mount the equipment elements and system elements. Particularly on the fuselage of an aircraft, the frames or the floor structure are areas of the aircraft where there are many elements to be added, both structural elements and system elements, such as electric cables. So it is important to allow elements to be mounted on the stiffeners by simplifying the structural parts to the maximum by integrating functions.

SUMMARY

The goal of the disclosed embodiments is to fix the drawbacks of the techniques described above. For this purpose, the disclosed embodiments propose a stiffener that has a section that allows it both to be autostabilized and to ensure that elements can be added on. Such a stiffener is self-sufficient for mechanical behavior and has a plane core for mounting an element. To do so, the stiffener in the disclosed embodiments has a bottom part that has a shape similar, in stability, to an Ω, and a top part with a supporting surface for more elements.

More specifically, the disclosed embodiments concern a stiffener for a structure subject to tensile and/or compressive and/or shearing stresses, characterized by the fact that it has a λ-shaped cross section with:

an area in contact with an element being stiffened that has a closed section and provides stability; this area has a first and second leg, and a core perpendicular to the element being stiffened, giving it a supporting surface suitable for mounting an element; this core is formed by one of the two legs.

The stiffener in the disclosed embodiments can also have one or more of the following features:

the stiffener is made of a composite material,
the first leg is a long leg; the second leg is a short leg; the two legs meet at a junction forming an overlap,
the core (12) is comprised of a part with a long leg (6),
the short leg is symmetrical with the long leg in relation to an axis XX passing through the junction,
each leg has a stabilization cap,
the long leg has a C-shaped cross section,
the long leg has a Z-shaped cross section,
the short leg has an L-shaped cross section,
the long leg (6) has a head (64) formed on one end opposite the stabilization cap (63) ensuring inertia.

The disclosed embodiments also concern an aircraft structure, characterized by the fact that it has at least one stiffener, as defined above.

The disclosed embodiments also concern an aircraft having at least one of these stiffeners.

BRIEF DESCRIPTION OF THE DRAWINGS

FIG. 1, already described, shows a stiffener with a Z-shaped cross section.

FIGS. 2A and 2B, already described, show a stiffener with a T-shaped cross section.

FIG. 3, already described, shows a stiffener with an Ω-shaped cross section.

FIG. 4 shows a first configuration of a stiffener with the λ-shaped cross section in the disclosed embodiments.

FIG. 5 shows a second configuration of the stiffener with the λ-shaped cross section in the disclosed embodiments.

FIGS. 6A and 6B, which are combined in the configuration in FIG. 5, show the centers of gravity of the stiffeners with the λ-shaped cross section in the disclosed embodiments.

DETAILED DESCRIPTION

Figure 7:
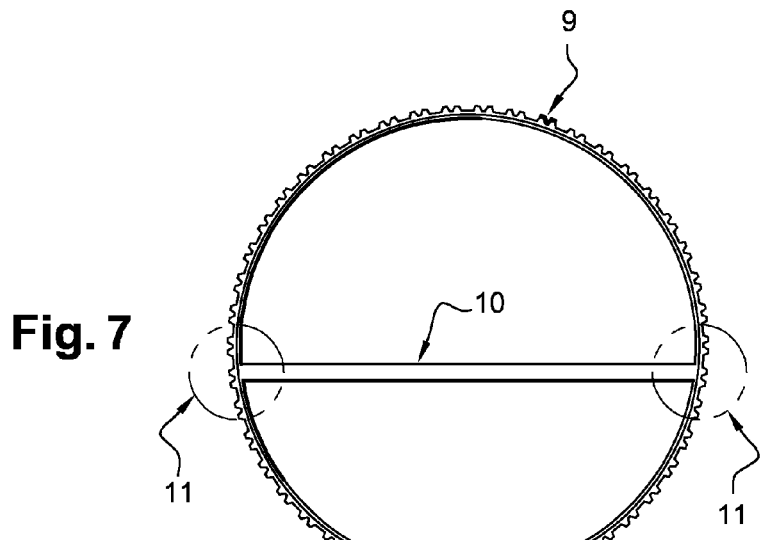
FIG. 7 shows an example of a frame in the disclosed embodiments and cross-pieces of flooring in the fuselage of an aircraft.

The disclosed embodiments concern a stiffener for a structural element, particularly of an aircraft that has a stiffener with the λ-shaped cross section in the disclosed embodiments. This λ shape gives the stiffener autostability and allows elements to be mounted.

As will be described, a λ-shaped cross section can, for example, be applied to a longitudinal stiffener, i.e., a stringer, or a radial stiffener, i.e., a frame.

A stiffener with a λ-shaped cross section combines the advantages of the autostabilized stiffener described above and stiffeners suitable for mounting elements, also described above. For this, the stiffener with a λ-shaped cross section has a bottom part with two supporting points for autostability and a top part with a supporting surface for mounting elements. The bottom part is in contact with the element being stiffened: it has a closed cross section. The top part has the core 12 of the stiffener; this core is perpendicular to the element being stiffened.

Examples of stiffeners with λ-shaped cross sections are shown in FIGS. 4 and 5. More specifically, FIG. 4 shows an initial configuration of a λ-shaped cross section of a stiffener in the disclosed embodiments. This λ-shaped cross section, called more simply a λ stiffener, has a long leg 6, also called the big leg, and a short leg 7, also called the small leg. The small and big legs are made of identical materials. They are preferably identical in thickness, at least over part of the length of the leg.

The small leg 7 joins the big leg 6 at a junction 8 forming an overlap in that place.

The big leg 6 is the main leg of the stiffener. The small leg 7 is the stabilizer of the stiffener.

Each leg has several sectors. The small leg 7 has a first sector 71 located at the junction 8 of the two legs. It has a second 72 forming an obtuse angle with the first sector 71. It has a third sector 73, called a cap, whose role is to allow the stiffener to be connected to the element being stiffened. However, locally, this third sector can be absent from the leg of the stiffener to limit its weight.

The big leg 6 has a first sector 61, joined side by side to the first sector 71 of the small leg 7. The length of the first sector of the big leg 6 is longer than the length of the small leg 7 and forms a supporting surface 61 for any other potential structures (cross-pieces . . . ). This sector 61 of the big leg 6 constitutes the core 12 of the stiffener. The big leg 6 has a second sector 62 forming an obtuse angle with the first sector 61. The big leg 6 also has a third sector 63 forming a cap whose role is to connect the stiffener to the element being stiffened. However, locally, this third sector may be absent from the leg of the stiffener to limit its weight.

This small leg 7 is symmetrical to the big leg 6 on an axis XX passing through the junction.

The big leg 6 also has a fourth sector 64 forming an approximately right angle with the first sector 61 so that said fourth sector is plane. Thus, the fourth sector 64, also called the head, helps increase the inertia of the stiffener. For this purpose, the thickness of the fourth sector 64 can be greater than that of the other sectors of the big leg 6.

As an example, a stiffener with a cross section λ can have a total height of 110 millimeters with legs 2.6 mm thick, except for the fourth sector 64 of the big leg, which is 5 mm thick. The junction between the two legs then has an overlap of 5.2 mm. The length of this junction 8 can be 24 mm, for example.

A λ-shaped stiffener has a stability as powerful as an Ω-shaped stiffener considering the areas where it is in contact with the element being stiffened, i.e., the areas where its legs have their third sectors 63 or 73. In effect, in these areas, the stiffness associated with the element being stiffened makes it possible to obtain a closed section. Due to its stability, such a λ-shaped stiffener can undergo a tensile, compressive and shearing load and allow elements to be mounted.

In the configuration shown in FIG. 4, the sectors of the big leg 6 approximately form a Z. The big leg can be said to have a Z-shaped cross section. The sectors of the small leg approximately form a turned L. The small leg can be said to have an L-shaped cross section.

In the configuration shown in FIG. 5, the sectors of the big leg 6 approximately form a C. The big leg can be said to have a C-shaped cross section. The sectors of the small leg approximately form a turned L. The small leg can be said to have an L-shaped cross section.

The difference between the two configurations lies in the orientation of sector 64: on the big leg side 6 or the small leg side 7. The choice of configuration of the λ-shaped stiffener depends on the shape and orientation of the element being mounted on the supporting surface 61 of the stiffener.

Whatever the configuration of the λ-shaped stiffener in the disclosed embodiments, the two legs of the stiffener are made of the same material. This material can be metal. This material can also be a composite material, which has the advantage that the legs of the lambda can be integrated with one another during the fabrication of the stiffener. Then no mechanical application is necessary to join the two legs of the stiffener. For example, the big leg and the small leg of the lambda can be co-injected or co-fired, etc. In this case, after appropriate dimensioning of the stiffener, there is no risk of the two legs separating due to the effect of forces applied to the structural element.

In one preferred embodiment of the disclosed embodiments, the two legs of the stiffener are made of two dry performs, which are both molded at the same time in the same mold, for example, by an RTM process (Resin Transfer Molding). Thus, co-injecting the two legs of the stiffener makes it possible to obtain penetration between the two legs near the junction. The stiffener in the disclosed embodiments can be made of fiber cloth, that is, fibers woven on a frame and a chain or web of fibers, i.e., fibers going in one direction. The choice of the type of fibers depends on the forces that the stiffener must withstand.

FIGS. 6A and 6B show a λ-shaped stiffener, according to the configuration in FIG. 5, in the area where the element being stiffened (with cap, FIG. 6A) is mounted and outside the mounting area with the element being stiffened (without cap, FIG. 6B). These FIGS. 6A and 6B show the center of gravity of the stiffener for each area of said stiffener. Note that whatever the area, the center of gravity is never located on the stiffener, but is extremely close to it. In the case in FIG. 6A, the center of gravity G1 is just to the side of the big leg 6 of the stiffener, outside the stiffener. In the case in FIG. 6B, the center of gravity G2 is completely outside the stiffener. The proximity of the center of gravity of the stiffener to its core is a characteristic of the stiffener that helps give it its autostabilizing character.

FIG. 7 shows an example of the frame of an aircraft fuselage modeled according to the stiffener in the disclosed embodiments, which allows elements from the floor structure (here a crosspiece) to be mounted while it has a stable frame. In aeronautics, constructing a frame with a round or oval cross section in one single piece is complicated. So, generally, a frame is built of several sectors spliced one after another. These sectors are examples of structural elements that can be thought of as stiffeners in the disclosed embodiments. In the example in FIG. 7, a frame 9 of 360° is built, according to the stiffener in the disclosed embodiments; this allows a floor cross piece 10 to be hooked onto this frame 9 at two junctions 11.

Figure 8A:
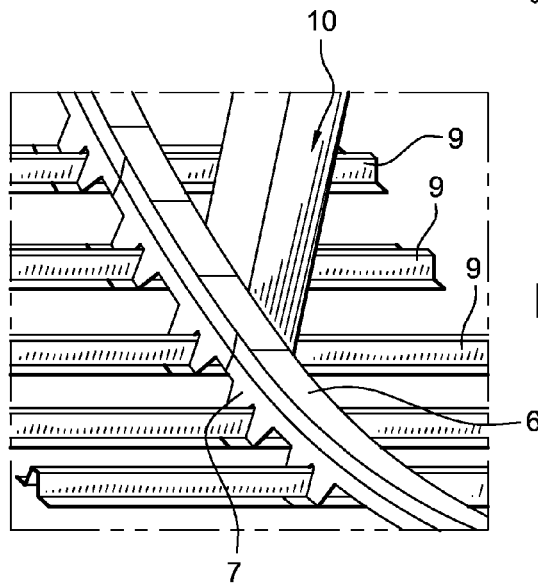
FIGS. 8A and 8B show details of the frame/cross-piece connection already shown in FIG. 3.
Figure 8B:
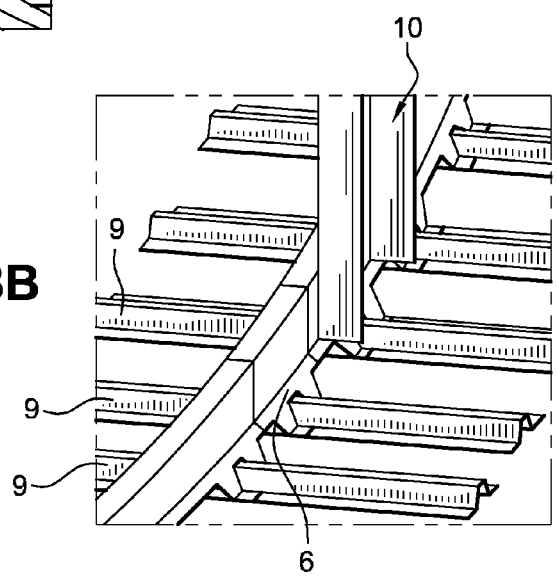

The connection between the frame in the disclosed embodiments and the cross-piece in FIG. 7 is shown in greater detail in FIGS. 8A and 8B. As already explained, the frame 9 has a λ-shaped section. It thus has, over its entire length, several small legs 7 and several big legs 6, as shown in FIGS. 8A and 8B. In the example shown in FIGS. 8A and 8B, the floor cross-piece 10 is supported against the big leg 6 of the stiffener. In this case, the stiffener is the type shown in FIG. 4, that is, it has a big Z-shaped leg 6. This type of stiffener, in the example in FIGS. 8A and 8B, makes it possible to mount the floor cross piece more easily due to the orientation of the head 64 of the stiffener. The supporting surface 61 of the big leg 6 makes it possible to mount one or more other elements.

In the example of FIGS. 8A and 8B, the frame is mounted directly on the caps of the stringers. The frame can be said to be semi-floating. In other configurations, the frame can be non-floating, mounted directly from the frame onto the skin of the fuselage and potentially also on the caps of the stringers, or floating (not mounted directly from the frame onto the stiffened skin, with the skin and the frame connected by clips).

The invention claimed is:

1. A stiffener for a structure subject to tensile and/or compressive and/or shearing stresses, the stiffener having a λ-shaped section that includes:
    a contact area configured to connect the stiffener to the structure, the contact area comprising a first surface area and a second, spaced apart, surface area, both surface areas lying in the same plane; the first and second surface areas of the contact area respectively having a first and a second leg extending therefrom, which legs come together at a junction forming an overlap, the first leg being a long leg and the second leg being a short leg, and the legs and the plane in which the first and second surface areas lie defining a closed cross section, and
    a core extending perpendicular to the plane in which the contact area lies, giving the stiffener a supporting surface for mounting an element; the core being made up of one of the two legs.

2. The stiffener according to claim 1, comprising a composite material.

3. The stiffener according to claim 1, wherein the core is comprised of part of the long leg.

4. The stiffener according to claim 1, wherein the small leg is symmetrical with the long leg on axis (XX) passing through the junction.

5. The stiffener according to claim 1, wherein each leg has a stabilization cap forming a portion of the contact area.

6. The stiffener according to claim 5, wherein the long leg has a head formed on one end opposite the stabilization cap ensuring inertia.

7. The stiffener according to claim 1, wherein the long leg has a C-shaped cross section.

8. The stiffener according to claim 1, wherein the long leg has a Z-shaped cross section.

9. The stiffener according to claim 1, wherein the short leg has an L-shaped cross section.

10. An aircraft structure, comprising at least one stiffener according to claim 1.

11. An aircraft having at least one stiffener according to claim 1.

* * * * *